United States Patent [19]

Doi et al.

[11] 3,842,294
[45] Oct. 15, 1974

[54] ELECTROMECHANICAL TRANSDUCER COMPRISING A PAIR OF ANTIPARALLEL POLED RECTANGULAR PIEZOELECTRIC CERAMIC PIECES

[75] Inventors: Kikuo Doi; Takehiro Futami, both of Tokyo, Japan

[73] Assignee: Nippon Electric Company, Limited, Tokyo, Japan

[22] Filed: Nov. 7, 1973

[21] Appl. No.: 413,718

[30] Foreign Application Priority Data
Nov. 8, 1972  Japan.............................. 47-112359

[52] U.S. Cl.................... 310/9.5, 310/8.2, 310/9.6, 310/9.7, 333/72, 310/8.6
[51] Int. Cl............................................ H04r 17/00
[58] Field of Search........... 310/8, 8.2, 8.3, 8.5, 8.6, 310/9.5, 9.6; 333/72

[56] References Cited
UNITED STATES PATENTS

| | | | |
|---|---|---|---|
| 2,121,779 | 6/1938 | Ballantine | 310/8.6 X |
| 2,444,590 | 7/1948 | Bokeny | 310/8.6 |
| 2,838,696 | 6/1958 | Thurston | 310/9.5 X |
| 3,067,296 | 12/1962 | Heinlein | 310/8.6 X |
| 3,219,850 | 11/1965 | Langevin | 310/8.6 |
| 3,376,521 | 4/1968 | Traub | 310/8.2 X |
| 3,486,136 | 12/1969 | Traub | 310/8.2 X |
| 3,774,057 | 11/1973 | Tsubouchi | 310/9.5 |

*Primary Examiner*—Mark O. Budd
*Attorney, Agent, or Firm*—Sughrue, Rothwell, Mion, Zinn & Macpeak

[57] ABSTRACT

A torsional mode electromechanical transducer comprises a pair of rectangular ceramic pieces poled longitudinally and made integral, with a longer side surface of one of the ceramic pieces attached to a similar surface of the other and with the residual polarization directed antiparallel. A mechanical resonator having a planar surface may be used as one or each of the electrodes for exciting the transducer, with the ceramic pieces attached to the planar surface.

5 Claims, 4 Drawing Figures

PATENTED OCT 15 1974　　　　　　　　　　　　　3,842,294

ELECTROMECHANICAL TRANSDUCER COMPRISING A PAIR OF ANTIPARALLEL POLED RECTANGULAR PIEZOELECTRIC CERAMIC PIECES

BACKGROUND OF THE INVENTION

This invention relates to a torsional mode electromechanical transducer comprising a pair of piezoelectric ceramic pieces, such as may be used in a mechanical filter.

A filter plays an important role in multiplexed communication on connecting or distributing transmission channels. As the channels become highly multiplexed, high selectivity and high stability are urgently required of a filter. In this connection, a mechanical filter is featured by its large Q-value and high stability far exceeding those of a filter comprising conventional electric circuit elements (coils and capacitors) because of its mechanical vibrator or resonator made of an elastically invariable material. A mechanical filter is further featured by its compactness, rigidness, and high performance.

Such mechanical filters have been used in various apparatus. With the progress in communication techniques, requisites for extreemly small-sized mechanical filters have become urgent. For a mechanical resonator, the relation between the resonance frequency and the mechanical dimensions is uniquely determined by the mode of vibration. For example, the resonance frequency is determined by the length of the mechanical resonator for a longitudinal or a torsional mode of vibration and by the length and the thickness for a bending mode of vibration. Among the longitudinal and the torsional modes of vibration that are frequently used in a mechanical resonator, the propagation speed of the longitudinal mode of vibration is much higher than that of the torsional mode of vibration. With a higher speed of propagation, a mechanical resonator of given dimensions provides a higher resonance frequency. The torsional mode of vibration is therefore advantageous in miniaturizing a mechanical resonator and, in addition, insures a high Q-value and an excellent stability.

On the other hand, proposals have been made of a torsional mode electromechanical transducer comprising a piezoelectric ceramic piece. Such an electromechanical transducer, however, is complicated in structure and is difficult to manufacture on an industrial scale because of the troubles that must be overcome to shape, finish, and pole the piezoelectric ceramic piece and to attach the same to a mechanical resonator.

An electromechanical transducer comprising a piezoelectric ceramic piece substantially rectangular in outline and oppositely poled along opposite side surfaces is disclosed in a prior United States patent application Ser. No. 397751 filed Sept. 17, 1973, by the present applicants and in a counterpart German Pat. application No. P 23 46 978.5 filed Sept. 18, 1973. It is easy to shape and pole the piezoelectric ceramic piece used in the prior patent application transducer and to attach electrodes to the ceramic piece. In addition, the transducer has a high mechanical quality factor and a low impedance, which characteristics are particularly important for a mechanical signal filter used in channel translating equipment for higher carries frequencies, such as 112 kHz. The transducer, however, has a relatively large capacitance ratio and is not suitable as a channel filter of the channel translating equipment.

SUMMARY OF THE INVENTION:

It is therefore an object of the present invention to provide a torsional mode electromechanical transducer having a small capacitance ratio and yet easy to manufacture.

It is another object of this invention to provide an electromechanical transducer having a relatively large electrostatic capacity.

It is still another object of this invention to provide an electromechanical transducer having a mechanical quality factor and a frequency stability sufficiently high for use in a channel filter for channel translating equipment.

In general, an electromechanical transducer comprises a piezoelectric ceramic piece poled in a specific manner and a pair of electrodes attached to the opposing principal surfaces of the ceramic piece, respectively. The ceramic piece may substantially be rectangular. In accordance with this invention, the rectangular ceramic piece is poled longitudinally. A similar piezoelectric ceramic piece is made integral with the above-mentioned ceramic piece with the residual polarization directed antiparallel. The electrodes are attached to the common principal surfaces of the ceramic pieces. A mechanical resonator having a planar surface may be used as one or each of the electrodes, with the ceramic pieces attached to the planar surface.

Figure 1:
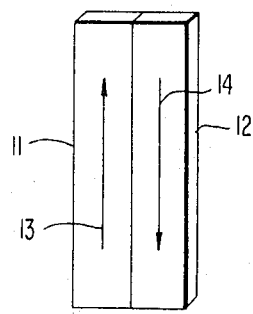
FIG. 1 is a schematic perspective view of an electromechanical transducer according to a first embodiment of the instant invention.

DESCRIPTION OF THE PREFERRED EMBODIMENTS:

Referring to FIG. 1, an electromechanical transducer according to a first embodiment of the present invention comprises a pair of substantially rectangular piezoelectric ceramic pieces 11 and 12 poled longitudinally and made integral with a long side surface of one of the ceramic pieces 11 and 12 attached to a similar surface of the other and with the residual polarization directed antiparallel as exemplified by arrows 13 and 14. The piezoelectric material may, for example, be barium titanate ($BaTiO_3$) or a solid solution of lead titanate ($PbTiO_3$) and lead zirconate ($PbZrO_3$). Such ceramic pieces may be made by producing a substantially parallel strong d.c. electric field in a block of the piezoelectric material having a pair of electrodes for poling (not shown) and then slicing the block into thin ceramic pieces. A pair of such ceramic pieces may be made integral in the manner specified above with the use of an electrically insulating bonding agent. The transducer further comprises a pair of electrodes for excitation (not specifically shown in FIG. 1 for mere convenience of illustration) attached to the common principal surfaces of the ceramic pieces 11 and 12.

Figures 2, 3:
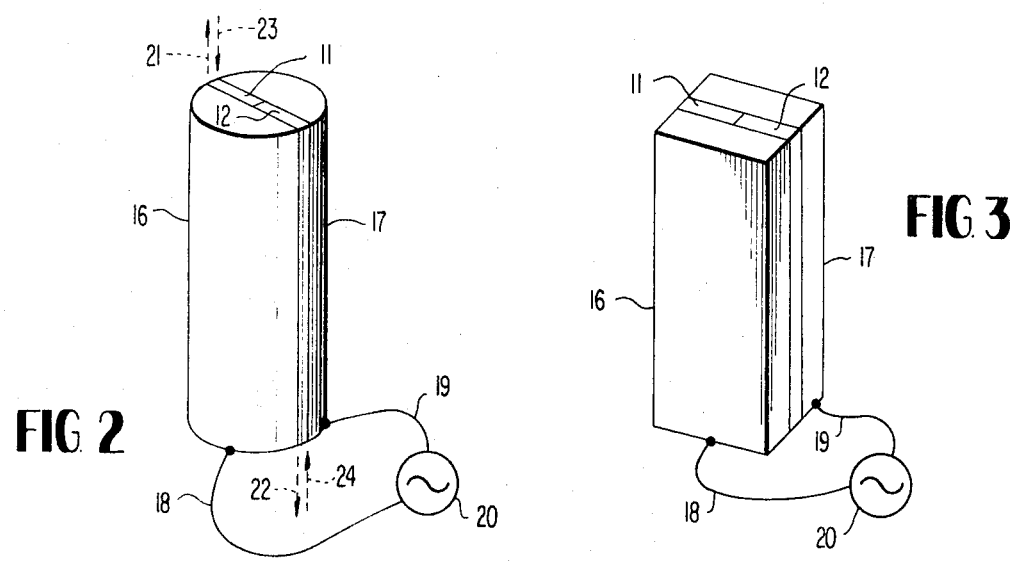
FIG. 2 is a similar view of an electromechanical transducer according to a second embodiment of this invention.
FIG. 3 is a similar view of an electromechanical transducer according to a third embodiment of this invention.

Referring to FIG. 2, an electromechanical transducer according to a second embodiment of this invention comprises similar components designated with like reference numerals as in FIG. 1. Here, the electrodes are provided by a pair of mechanical resonators or vibrators 16 and 17, each having at least one planar surface. The ceramic pieces 11 and 12 are sandwiched between the planar surfaces of the resonators 16 and 17 and bonded thereto with an electroconductive bonding agent. Each of the resonators 16 and 17 is made of an elastically invariable material into an approximate shape of a cylinder cut into two along the axis. A pair of lead wires 18 and 19 are attached to the respective resonators 16 and 17 for application thereto of an a.c. voltage for excitation from a driving power source 20.

Further referring to FIG. 2, it will be understood that the driving a.c. voltage is applied perpendicular to the piezoelectric ceramic pieces 11 and 12 and accordingly to the directions of the residual polarization. As is already known in the art, it is sufficient for production of sliding stress within an electrostrictive transducer that the direction of the applied a.c. voltage be perpendicular to the direction of the residual polarization. The ceramic pieces 11 and 12 are therefore subjected to sliding stress exemplified with broken lines 21 and 22 or 23 and 24.

Referring to FIG. 3, an electromechanical transducer according to a third embodiment of this invention comprises parts similar to those illustrated with reference to FIGS. 1 and 2 and designated with like reference numerals. The electrodes are provided by mechanical resonators 16 and 17, each having at least one planar surface. Here, each of the resonators 16 and 17 is made of an elastically invariable material into a rectangular parallelopiped shape.

As has been described hereinabove, it is possible to use only one of the resonators 16 and 17 as one of the electrodes, with the other electrode provided by a metal film attached to one of the common principal surfaces of the ceramic pieces 11 and 12, as by way of evaporation of gold.

Figure 4:
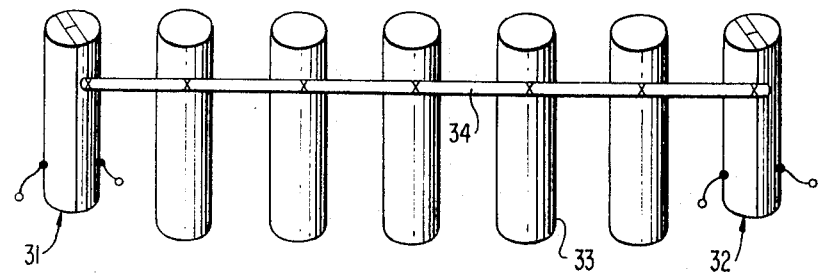
FIG. 4 is a schematic perspective view of a mechanical filter comprising a pair of electromechanical transducers according to this invention.

Referring now to FIG. 4, a mechanical filter comprises a pair of electromechanical transducers 31 and 32 according to this invention and a plurality of mechanical resonators 33. A coupling rod 34 is welded to the transducers 31 and 32 and to the mechanical resonators 33.

Several lead zirconate-titanate ceramic pieces were provided, 12 mm long, 2.1 mm wide, and 1 mm thick. For the radial mode of vibration, the electromechanical coupling factor was 65 percent and the mechanical quality factor $Q_m$ was 1,000. The ceramic pieces were poled by the use of a d.c. electric field between 2 and 3 kV/mm at 100°C for 30 minutes. Mechanical resonators were made of rods of an iron-nickel-chromium alloy known as "elinvar," 4.2 mm in diameter and 12 mm long, into the form outlined in FIGS. 2 and 4 by cutting off 2.6 mm in sagitta. In addition, rectangular parallelopiped mechanical resonators, 12 mm long, 4.2 mm wide, and 1.6 mm thick, were made of "elinvar." The principal surfaces of the piezoelectric ceramic pieces 11 and 12 and the planar surfaces of the resonators 16 and 17 were rendered mirror flat. The electrically insulating bonding agent includes an epoxy resin known by the trademark "Araldite" of Ciba Limited as the principal component. The electrically conductive bonding agent consits mainly of a silver paste.

The following Table shows the typical results obtained with the torsional mode of vibration for various combinations of the piezoelectric ceramic pieces and the mechanical resonators.

| electromechanical transducer | resonance frequency (kHz) | capacitance ratio | mechanical quality factor $Q_m$ | capacity at 1 kHz (pF) |
|---|---|---|---|---|
| FIG. 2 | 102.5 | 13 | 500 | 253 |
| FIG. 3 | 98.9 | 18 | 550 | 244 |
| FIG. 2, with one half-cylindrical resonator | 95.8 | 63 | 600 | 250 |
| FIG. 3, with one parallelopiped resonator | 93.1 | 70 | 580 | 260 |

It is readily seen from the Table that the resonance frequency of the electromechanical transducer according to this invention is low as compared with the bulk thereof, that the transducers have an excellent piezoelectric activity and a high electromechanical conversion efficiency, and that the capacitance ratio is sufficiently small. Decrease in the capacitance ratio is remarkable when each of the electrodes is provided by a mechanical resonator as exemplified in FIGS. 2 and 3. The electrostatic capacity is sufficiently large, amounting in some cases to 300 pF, because the common principal surfaces of the piezoelectric ceramic pieces 11 and 12 are considerably wide.

What is claimed is:

1. A torsional mode electromechanical transducer including a first substantially rectangular piezoelectric ceramic piece having a pair of principal surfaces and a pair of electrodes attached to said principal surfaces, respectively, wherein the improvement comprises a second substantially rectangular piezoelectric ceramic piece having a pair of principal surfaces and a long side surface attached to one of the long side surfaces of said first ceramic piece, the principal surfaces of said first and second ceramic pieces forming common principal surfaces, said first and second ceramic pieces being poled substantially longitudinally and antiparallel, said electrodes being attached also to the respective principal surfaces of said second ceramic piece.

2. A transducer as claimed in claim 1, wherein a pair of mechanical resonators, each having at least one planar surface, are used as said electrodes, respectively, with said planar surface attached to each of said common principal surfaces.

3. A transducer as claimed in claim 2 of a shape of a cylinder in outline, said first and second ceramic pieces being disposed axially along a substantial diametrical plane of said cylinder.

4. A transducer as claimed in claim 2 of a shape of a square prism in outline, said first and second ceramic pieces being disposed axially along a substantial bisecting plane of said prism.

5. A transducer as claimed in claim 1, wherein a mechanical resonator having at least one planar surface is used as one of said electrodes, with said planar surface attached to one of said common principal surfaces.

* * * * *